Sept. 26, 1939.　　　　L. D. MILLER　　　　2,173,947
DIGGING IMPLEMENT
Filed March 19, 1938
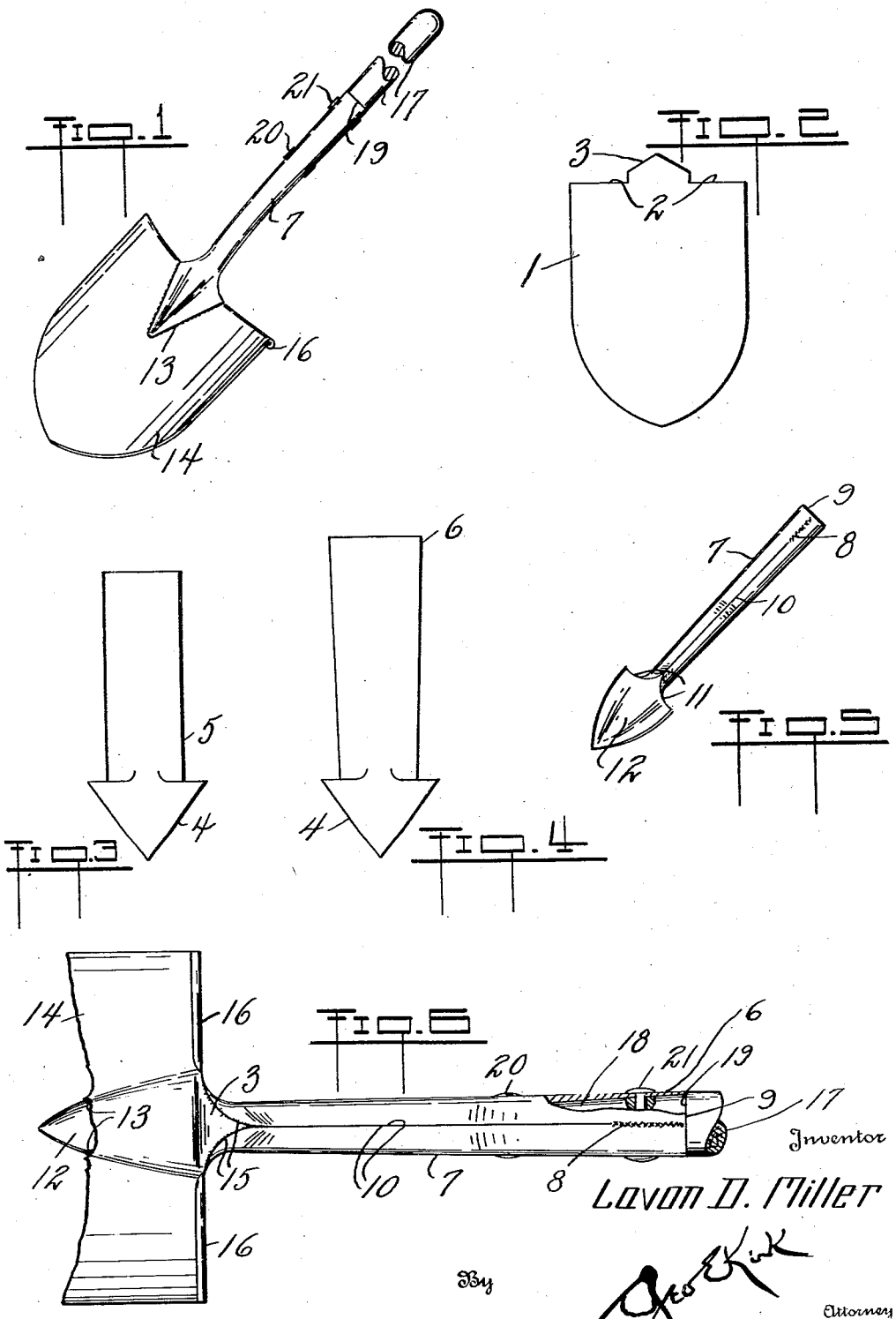
Inventor
Lavon D. Miller
By
Attorney Patented Sept. 26, 1939

2,173,947

UNITED STATES PATENT OFFICE 2,173,947

DIGGING IMPLEMENT

Lavon D. Miller, Hicksville, Ohio

Application March 19, 1938, Serial No. 196,845

1 Claim. (Cl. 294—49)

This invention relates to bulk material moving tools.

This invention has utility in the blade and mounting thereof in a directing handle as for a spade, shovel, scoop, or the like.

Referring to the drawing:

Fig. 1 is a perspective view, with parts broken away, of an embodiment of the invention;

Fig. 2 is a view of the blank for the blade as embodied in a shovel;

Fig. 3 is a view of the blank for the blade mounting;

Fig. 4 is a view of the blade mounting as elongated near one portion for tapering or thinning out thereof;

Fig. 5 is a perspective view from the rear or under side of the formed mounting sleeve and reinforcement for the blade as shaped from the blank of Fig. 4; and Fig. 6 is a fragmentary rear or bottom view of the assembled blade and mounting sleeve.

Implement blade 1 is shown with cross-portion 2 with tapering tongue 3 centrally therefrom. This forms the major element in dimension and gage for the sheet metal. The minor or less gage element is herein shown as blank having spear head 4 with oblong extension 5 therefrom. This gage ratio may be determined according to the character of work. The blank for the spear head and extension may be in proportion as much as one-third of the metal for the blade and mounting. In selecting the gauge for this sleeve and spear head there may be conserved ample factor of rigidity and strength at a saving of as much as five per cent in the over-all weight.

Furthermore, in this dimension for the extension 5, even as of the reduced or lesser gage, such may be worked out or thinned to have taper portion 6 (Fig. 4) remote from the spear head 4. As thus supplementally shaped, this extension 5, 6, may be formed into sleeve 7 with weld closure 8 completing locked peripheral form for terminus 9 of this sleeve. In practice, it may be desirable to leave adjacent edges 10 approximately abutting in their extent to the spread portions 11 where this sleeve 7 has concave merging portion 12 into the frog-shape or hump as assembled by welding 13 with front side of formed blade 14 from the blank 1.

In addition to this welding 13 on the face of the blade this tool or implement has its back closed and the tongue 3 has weld anchoring 15 with the portions 11, in supplementally reinforcing this sleeve assembly with the blade for increased factor of strength at this high strain joint or region. Furthermore, the blade portions 2 are flanged or provided with bead-over portions 16 in the outward extent from this sleeve portion 7 forming the handle socket. In such socket of the inwardly curved sleeve 7 may be inserted wood handle 17 having tapered terminal portion 18 to minor narrow offset 19 as the abutting portion for the end 9 of this sleeve 7. The handle 17 accordingly conforms to an extent with the sleeve 7.

The meeting edge portions 10 are factors for resilience or springiness in shovel or implement operation, and if left hollow beyond the end of the handle 7 is further factor in lightness for this strength of tool, notwithstanding the taper portion 6 may be a factor for increasing the length of the sleeve ten per cent over that of the extension 5. In this assembly there may be final anchoring by rivets 20, 21, through the sleeve 7 and the wood handle 17 as therein.

What is claimed and it is desired to secure by Letters Patent is:

A digging implement embodying a blade having major sheet metal parts of differing thickness wherein the blade is thicker and provided with a tongue and a mounting sleeve of lesser thickness and further progressively reduced in thickness to approximate flush merging with the handle therefor remote from the blade and there permanently joined, said tongue providing a bond for the sleeve adjacent the blade with the sleeve provided with a reinforcing hump extension over the blade.

LAVON D. MILLER.